United States Patent Office

2,938,882
Patented May 31, 1960

2,938,882
VINYL AROMATIC POLYMERS STABILIZED WITH N-METHYLAMINOALKANOLS

William K. Schweitzer, Jr., Midland, Mich., assignor to The Dow Chemical Company, Midland, Mich., a corporation of Delaware No Drawing. Filed July 2, 1956, Ser. No. 595,068

6 Claims. (Cl. 260—45.9)

This invention concerns compositions of matter consisting essentially of thermoplastic vinyl aromatic polymers and certain tertiary N-methylaminoalkanols as stabilizing agents for inhibiting the polymer against the discoloring and embrittling effects of exposure to light, heat or out-of-doors weathering.

Polystyrene is known to undergo undesirable physical changes upon prolonged exposure to light, heat or out-of-doors weathering. The observable symptoms of such changes are discoloration or embrittling, or both, due in varying measure to the oxygen content of the atmosphere in which it is exposed, the temperature and the presence or absence of sunlight. Such changes result in lowering of the mechanical properties of the polystyrene and impairment of its appearance. This characteristic is shared to more or less extent by other vinyl aromatic polymers containing 70 percent by weight or more of one or more monovinyl aromatic hydrocarbons of the benzene series in the polymer molecule such as polystyrene, polyvinyltoluene, copolymers of at least 70 percent by weight of styrene and not more than 30 percent of a copolymerizable monoethylenically unsaturated organic compound, e.g. alpha-methyl styrene, acrylonitrile or methyl methacrylate. Since the uses of such polymers include the manufacture of molded articles, films, sheets, rods, bars, tubes, etc., either embrittlement or discoloration of the polymer is to be avoided. The provision of stabilized compositions consisting essentially of one or more vinyl aromatic polymers is the principal object of the invention.

According to the invention the foregoing object is attained by intimately incorporating with a thermoplastic vinyl aromatic polymer containing at least 70 percent by weight of one or more monovinyl aromatic hydrocarbons of the benzene series in the polymer molecule, from 0.1 to 5 percent by weight of a tertiary amine selected from the group consisting of the mono- and dimethyl N-substituted alkanolamines containing from 2 to 5 carbon atoms in an alkanol group and 3-dimethylamino-1,2-propanediol. Articles made from the resulting compositions show little, or no, tendency to discolor upon prolonged exposure to light, e.g. sunlight, or light rich in ultra-violet rays, and exhibit little tendency to become brittle as a result of such exposure.

The tertiary mono- and dimethyl N-substituted alkanolamines containing from 2 to 5 carbon atoms in an alkanol group and dimethylamino-1,2-propanediol have been found to be far more effective agents for inhibiting the discoloring and embrittling effects of light on vinyl aromatic polymers than are closely related tertiary amines such as diethylaminoethanol or diethylamino-1,2-propanediol, containing higher alkyl radicals as substituents on the nitrogen atom.

The tertiary mono- and dimethyl N-substituted alkanolamine stabilizers can be incorporated with the vinyl aromatic polymer in usual ways such as by heat-plastifying the polymer on compounding rolls, in a Banbury mixer or a plastics extruder and intimately blending the stabilizing agent therewith or by dissolving the polymer and the stabilizing agent in a common solvent and evaporating the latter to recover the polymer having said agent dispersed throughout.

In practice the vinyl aromatic polymer is usually heat-plastified on compounding rolls, in a Banbury mixer or a plastics extruder and the stabilizing agent intimately blended therewith to obtain a uniform composition, which is cooled and cut or ground to a granular form suitable for molding.

Small amounts of additives such as dyes, colors, pigments, plasticizers, lubricants, mold release agents, etc., can also be incorporated with the compositions, but such additives are not required. When used, the additives are usually employed in amounts of from 0.1 to 10 percent by weight of the polymer.

The following examples illustrate ways in which the principle of the invention has been applied, but are not to be construed as limiting its scope.

EXAMPLE 1

Granular molding grade polystyrene was blended with 0.5 percent of its weight of 1-dimethylaminoethanol by tumbling the ingredients in a laboratory blender. The mixture was fed to a laboratory extruder wherein it was heat-plastified and subjected to mechanical working, thereby intimately incorporating the ingredients with one another, then was extruded, cooled and cut to a granular form. Portions of the composition were injection molded to form test pieces having the dimensions 2 x 2½ inches by 0.1 inch thick. These test pieces were used to determine the effect of the added agent for inhibiting the discoloration of the polystyrene upon exposure to out-of-doors weathering. The procedure for determining the stabilizing action of the added agent was to measure the percent of light of wave lengths between 420 millimicrons and 620 millimicrons transmitted through a molded test piece when first prepared. The difference between the amount of light transmitted at wave lengths of 420 millimicrons and that transmitted at wave lengths of 620 millimicrons represents a measure of the color of the composition. The test pieces were exposed to out-of-doors weathering in the State of Florida U.S.A. at about latitude 25° North on a rack facing South with the test pieces inclined at an angle of 45 degrees above horizontal for a period of six months. After exposure of the test pieces to out-of-doors weathering for the prescribed time, the test pieces were removed and again tested for their color or ability to transmit light of wave lengths between 420 and 620 millimicrons. The difference between the amount of light of said wave lengths transmitted through the test piece represents a measure of the color of the test piece after said exposure. The difference between the color of a test piece of the composition to the out-of-doors weathering after exposure and the color of the test piece as initially prepared is a measure of the color change or degree of discoloration of the polymer upon exposure to weathering. The darker the polymer the greater is the difference. For purpose of comparison, test pieces of the polystyrene alone were prepared and tested under similar conditions. The results of the experiments are reported in Table I.

*Table I*

| Stabilizer | Percent | Initial color | Final color | Color change |
|---|---|---|---|---|
| None | 0.0 | 1.7 | 25.4 | 23.7 |
| 1-Dimethylaminoethanol | 0.5 | 5.3 | 13.7 | 8.4 |

EXAMPLE 2

In each of a series of experiments, granular molding grade polystyrene was intimately blended and incorporated with an alkanolamine in amount and kind as identified in the following table employing procedure similar to that employed in Example 1. Portions of the composition were injection molded to form test pieces having the dimension 2 x 2½ inches by 0.1 inch thick. The test pieces were exposed to out-of-doors weathering in the State of Florida U.S.A. for a period of 3 months. Table II identifies the experiments, names the alkanolamine and gives the amount employed based on the weight of the polystyrene. The table also gives the initial color of the test piece, the color after exposure to weathering and the color change. For purpose of comparison test pieces of the polystyrene without a stabilizing agent were prepared and tested under similar conditions. The results obtained were as follows:

EXAMPLE 3

In each of a series of experiments, granular polystyrene having a molecular weight corresponding to a viscosity characteristic of 22 centipoises as determined for a 10 weight percent solution of the polystyrene in toluene at 25° C. was blended with 3-dimethylamino-1,2-propanediol in amount as stated in the following table by tumbling in a laboratory blender. The mixture was fed to a laboratory extruder wherein it was heat-plastified and mechanically worked at a temperature of about 400° F. for a period of about 0.5 minute, then was extruded, cooled and cut to a granular form. Portions of the composition were injection molded to form test pieces having the dimensions 2 x 2½ inches by 0.1 inch thick. The molded pieces were tested for color, then exposed to weathering for a period of three months and again tested for color employing procedures similar to those employed in Example 1. For purpose of comparison, test pieces of the polystyrene alone were prepared and tested under similar conditions. The results are reported in Table III.

*Table II*

| Run No. | Alkanolamine | | Initial color | Final color | Color change |
|---|---|---|---|---|---|
| | Kind | Percent | | | |
| 1 | $(H_3C)_2NCH_2CH_2OH$ | 0.5 | 4.1 | 7.3 | 3.2 |
| 2 | $(H_3C)_2NCH_2CH_2CH_2OH$ | 0.5 | 3.5 | 8.0 | 4.5 |
| 3 | $(H_3C)_2NCH_2CH_2CH_2OH$ | 0.5 | 3.5 | 7.6 | 4.1 |
| 4 | $(H_3C)_2NCH_2CH_2CH_2CH_2CH_2OH$ | 0.5 | 4.0 | 7.6 | 3.6 |
| 5 | $(H_3C)_2NCH_2CHOHCH_3$ | 0.5 | 3.7 | 7.4 | 3.7 |
| 6 | $H_3CN(CH_2CH_2OH)_2$ | 0.5 | 5.3 | 7.6 | 2.3 |
| 7 | None | 0.0 | 1.8 | 22.7 | 20.9 |

*Table III*

| Stabilizing Agent | | Initial color | Final color | Color change |
|---|---|---|---|---|
| Kind | Percent | | | |
| None | 0.0 | 1.8 | 22.7 | 20.9 |
| 3-dimethylamino-1,2-propanediol | 0.5 | 5.6 | 7.4 | 1.6 |
| Do | 1.0 | 5.7 | 6.1 | 0.4 |
| Do | 1.5 | 5.8 | 5.5 | 0.3 |
| Do | 2.0 | 5.1 | 5.6 | 0.5 |

EXAMPLE 4

In each of a series of experiments, one percent by weight of 3-dimethylamino-1,2-propanediol was intimately incorporated with a resinous vinyl aromatic polymer as identified in the following table, employing procedure similar to that employed in Example 1. Portions of the composition were injection molded to form test pieces having the dimensions 2 x 2½ inches by 0.1 inch thick. These test pieces were tested for color, were exposed to out-of-doors weathering and again tested for color, employing procedures similar to those employed in Example 1. For purpose of comparison, test pieces of the vinyl aromatic polymer without the 3-dimethylamino-1,2-propanediol were prepared and tested under similar conditions. Table IV identifies the vinyl aromatic polymers employed and gives the initial color, the color after weathering and the color change determined for the polymers.

*Table IV*

| Run No. | Polymer Kind | 3-Dimethylamino-1,2-propanediol, Percent | Initial color | Final color | Color change |
|---|---|---|---|---|---|
| 1 | Polystyrene | 0.0 | 1.8 | 22.7 | 20.9 |
| 2 | do | 1.0 | 4.1 | 5.0 | 0.9 |
| 3 | Polystyrene with one percent by wt. of white mineral oil. | 0.0 | 1.6 | 29.3 | 27.7 |
| 4 | do | 1.0 | 4.0 | 6.3 | 2.3 |
| 5 | Polyvinyltoluene | 0.0 | 2.9 | 26.4 | 23.5 |
| 6 | do | 1.0 | 3.9 | 12.2 | 8.3 |
| 7 | Copolymer of 75% styrene—25% alpha-methylstyrene. | 0.0 | 1.2 | 19.2 | 18.0 |
| 8 | do | 1.0 | 3.8 | 4.9 | 1.1 |
| 9 | Copolymer of 70% styrene—30% acrylonitrile. | 0.0 | 16.8 | 23.5 | 6.7 |
| 10 | do | 1.0 | 11.4 | 11.7 | 0.3 |

I claim:
1. A composition of matter the essential constituents of which are a vinyl aromatic polymer consisting of at least 70 percent by weight of a monovinyl aromatic hydrocarbon of the benzene series having the vinyl radical directly attached to a carbon atom of the benzene nucleus, and not more than 30 percent by weight of a monoethyl- enically unsaturated organic compound selected from the group consisting of alpha-methyl styrene, acrylonitrile and methyl methacrylate, chemically combined in the polymer molecule and as a stabilizing agent therefor, from 0.1 to 5 percent, based on the weight of the polymer of a tertiary amine selected from the group consisting of 3-dimethylamino-1,2-propanediol and the mono- and dimethyl N-substituted alkanolamines containing from 2 to 5 carbon atoms in the alkanol radical and a single nitrogen atom in the molecule.

2. A composition as claimed in claim 1, wherein the stabilizing agent is 3-dimethylamino-1,2-propanediol.

3. A composition as claimed in claim 1, wherein the stabilizing agent is dimethylaminoethanol.

4. A composition as claimed in claim 1, wherein the stabilizing agent is methyldiethanolamine.

5. A composition as claimed in claim 1, wherein the stabilizing agent is 1-dimethylamino-2-propanol.

6. A composition of matter, the essential constituents of which are polystyrene and as a stabilizing agent therefor, from 0.1 to 5 percent, based on the weight of the polystyrene, of 3-dimethylamino-1,2-propanediol.

References Cited in the file of this patent
UNITED STATES PATENTS

| | | |
|---|---|---|
| 2,287,188 | Matheson et al. | June 23, 1942 |
| 2,681,328 | Stanton et al. | June 15, 1954 |
| 2,732,366 | Tubbs et al. | Jan. 24, 1956 |
| 2,809,955 | Matheson et al. | Oct. 15, 1957 |
| 2,810,707 | Nagle et al. | Oct. 22, 1957 |

FOREIGN PATENTS

| | | |
|---|---|---|
| 662,314 | Great Britain | Dec. 5, 1951 |